US012760202B2

(12) United States Patent
Yarita et al.

(10) Patent No.: US 12,760,202 B2
(45) Date of Patent: Oct. 13, 2026

(54) POLISHING COMPOSITION

(71) Applicant: Shin-Etsu Chemical Co., Ltd., Tokyo (JP)

(72) Inventors: Naoki Yarita, Joetsu (JP); Daijitsu Harada, Joetsu (JP); Harunobu Matsui, Joetsu (JP); Masaki Takeuchi, Joetsu (JP)

(73) Assignee: SHIN-ETSU CHEMICAL CO., LTD., Tokyo (JP)

( * ) Notice: Subject to any disclaimer, the term of this patent is extended or adjusted under 35 U.S.C. 154(b) by 877 days.

(21) Appl. No.: 17/732,242

(22) Filed: Apr. 28, 2022

(65) Prior Publication Data

US 2022/0372331 A1 Nov. 24, 2022

(30) Foreign Application Priority Data

May 24, 2021 (JP) ................................ 2021-086958

(51) Int. Cl.
*C09G 1/02* (2006.01)
*C09K 3/14* (2006.01)

(52) U.S. Cl.
CPC .............. *C09G 1/02* (2013.01); *C09K 3/1409* (2013.01)

(58) Field of Classification Search
CPC .......... C09G 1/02; C09K 3/1463; H10P 52/40
See application file for complete search history.

(56) References Cited

U.S. PATENT DOCUMENTS

2005/0204639 A1* 9/2005 Ishihara ............... C09K 3/1454 106/3
2005/0208883 A1* 9/2005 Yoshida ................... C09G 1/02 106/3
2012/0108064 A1* 5/2012 Suzuki .................. B24B 37/044 438/689
2015/0017574 A1 1/2015 Orihara et al.
2022/0325076 A1* 10/2022 Kim .................. H01L 21/30625

FOREIGN PATENT DOCUMENTS

EP 2412687 A1 * 2/2012 ............... B24B 1/00
EP 3 261 114 A1 12/2017
EP 3 444 309 A1 2/2019
(Continued)

OTHER PUBLICATIONS

Wayman, A.E., Turner, D.K., Rawat, A. et al. Fluorescence Correlation Spectroscopic Investigation of Surface Adsorption of CMP Slurry Additives on Abrasive Particles. MRS Online Proceedings Library 1560, 404 (2013) https://doi.org/10.1557/opl.203.1077 (Year: 2013).*
(Continued)

*Primary Examiner* — Alexandra M Moore
(74) *Attorney, Agent, or Firm* — Birch, Stewart, Kolasch & Birch, LLP

(57) ABSTRACT

A polishing composition including a colloidal silica containing colloidal silica particles, a pH adjusting agent, and a chelating agent provides a substrate that has a surface having a high flatness, low defects and a low surface roughness with low cost and high productivity, and a substrate having high surface quality suitable as a substrate for mask blanks such as a glass substrate containing $SiO_2$ as a main component, particularly, as a substrate for mask blanks used in EUVL.

10 Claims, 1 Drawing Sheet

(56) References Cited

FOREIGN PATENT DOCUMENTS

| | | | |
|---|---|---|---|
| EP | 3 447 100 | A1 | 2/2019 |
| JP | 2006-35413 | A | 2/2006 |
| JP | 2014-69260 | A | 4/2014 |
| WO | WO 2013/146990 | A1 | 10/2013 |

OTHER PUBLICATIONS

Lauren M Jacobsen et al. 2014 ECS Trans 61 (17) 55-63 (Year: 2014).*
"Dynamic Light Scattering" Weitz Lab Harvard https://projects.iq.harvard.edu/files/weitzlab/files/dynamiclightscattering.pdf (Year: 2025).*
European Search Report for Appl. No. 22170941.3 dated Oct. 24, 2022.

* cited by examiner

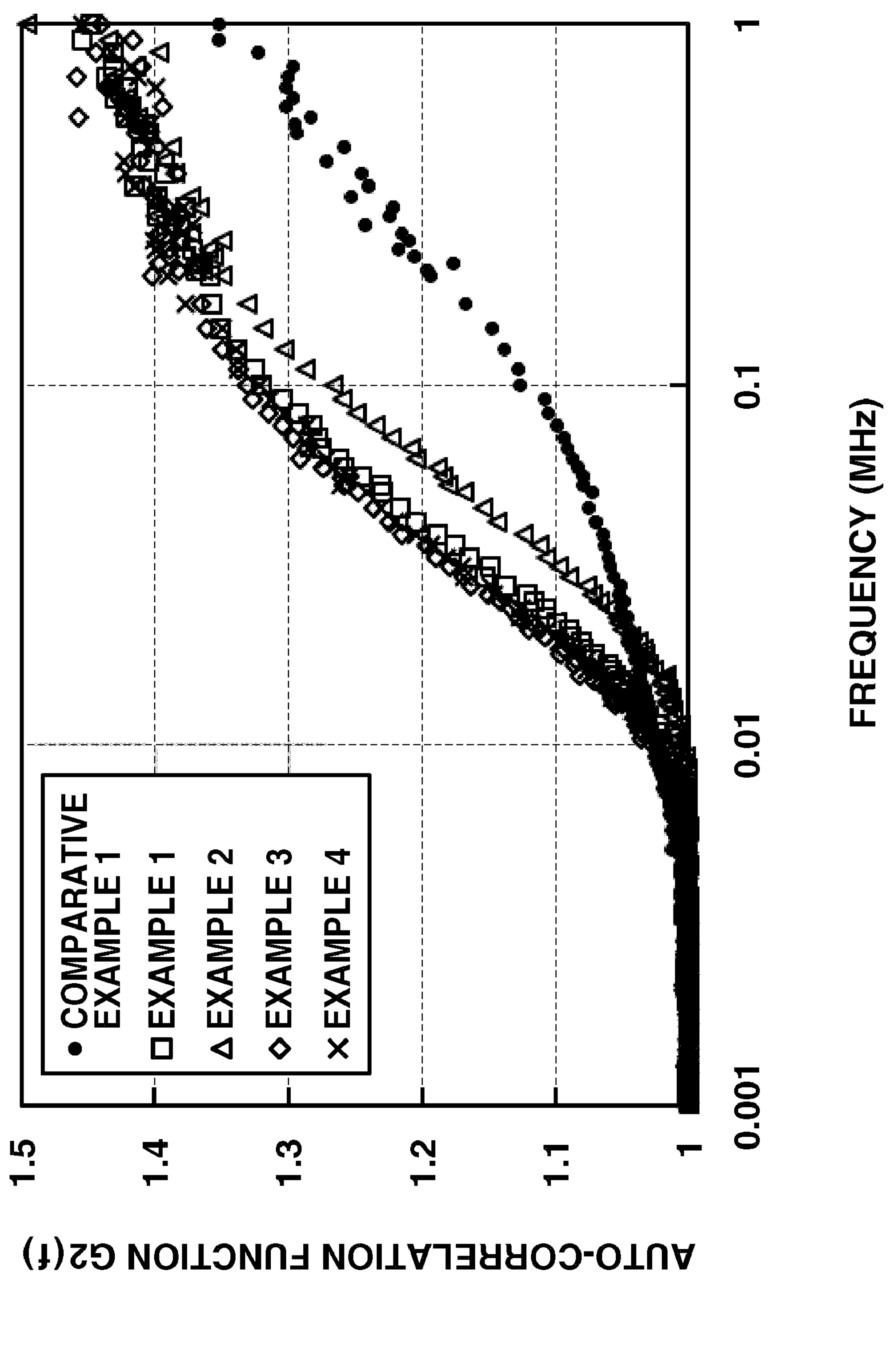
AUTO-CORRELATION FUNCTION G2(f)
1.5
1.4
1.3
1.2
1.1
1
0.001
0.01
0.1
1
FREQUENCY (MHz)
COMPARATIVE EXAMPLE 1
EXAMPLE 1
EXAMPLE 2
EXAMPLE 3
EXAMPLE 4

POLISHING COMPOSITION

CROSS-REFERENCE TO RELATED APPLICATION

This non-provisional application claims priority under 35 U.S.C. § 119(a) on Patent Application No. 2021-086958 filed in Japan on May 24, 2021, the entire contents of which are hereby incorporated by reference.

TECHNICAL FIELD

The present invention relates to a polishing composition suitable for surface polishing of a substrate for mask blanks such as a glass substrate containing $SiO_2$ as a main component, particularly, for surface polishing of a substrate for mask blanks used in EUV lithography.

BACKGROUND ART

In recent years, to realize formation of finer patterns than conventional photolithography using ultraviolet light, EUV lithography (hereinafter, abbreviated as "EUVL") that is an exposure technique using EUV (Extreme Ultra Violet, hereinafter abbreviated as "EUV") light is attracting attention. EUV light is light in a wavelength band of a soft X-ray region or a vacuum ultraviolet region that has a wavelength of about 0.2 to 100 nm, and a reflective mask is practically used as a transfer mask used in EUVL. A substrate for reflective mask blanks used for such a reflective mask is required to have a surface with a surface roughness, a flatness and a number of minute defects that have been highly reduced.

The surface quality of such a substrate for the mask blanks is significantly affected by characteristics of an abrasive used in the final stage of polishing process (hereinafter, referred to as final polishing). A colloidal silica dispersion has been widely used as the abrasive for the final polishing of the substrate for the mask blanks. However, to realize a highly reduced surface roughness and a highly reduced number of minute defects that are required on the surface of the substrate for the mask blanks used in EUVL, it is necessary to use a colloidal silica dispersion in which colloidal silica particles have a smaller diameter than that of conventionally used.

For example, as a method that can polish to a surface having a highly reduced surface roughness and a smooth surface having high surface accuracy, JP-A 2006-35413 (Patent Document 1) discloses a polishing method for a surface of a glass substrate for a reflective mask used in EUVL containing $SiO_2$ as a main component and by using a slurry that contains fine colloidal silica particles having an average primary particle size of not less than 5 nm and less than 20 nm, water and an acid, and has been adjusted so as to be a pH within the range of 0.5 to 4.

Further, WO 2013/146990 A1 (Patent Document 2) discloses a method for reducing roughness of a high spatial frequency region on a surface of a glass substrate by catalyst-referred etching CARE (Catalyst-Referred Etching, hereinafter, abbreviated as "CARE"). CARE is a method of removing convex portions on the surface of the substrate by active species generated from molecules that is absorbed on a catalyst in a treatment liquid to reduce surface roughness. WO 2013/146990 A1 reports that concave/convex shape (surface roughness) constituting the main surface becomes high uniform surface shape while maintaining extremely high smoothness by CARE, and in addition, defect sizes of the main surface tend to be decreased since a shape in which a proportion of the concave portion is higher than that of the convex portion with respect to a reference surface is formed in the surface of the glass substrate.

CITATION LIST

Patent Document 1: JP-A 2006-35413
Patent Document 2: WO 2013/146990 A1

SUMMARY OF THE INVENTION

As described in JP-A 2006-35413, if the fine colloidal silica particles having an average primary particle size of not less than 5 nm and less than 20 nm are used, the surface roughness can be reduced to some level. However, even if the average primary particle size is in the above range, when associated colloidal silica particles that have a high degree of association are used, it is difficult to form a surface roughness required for a surface of a substrate for mask blanks used in EUVL. Further, colloidal silica particles having a small average primary particles size are easy to bond solidly on the surface of the glass substrate containing $SiO_2$ as a main component compared with those having a large average primary particles size, thus, it is difficult to remove by a physical removal method such as an ultrasonic cleaning or a scrub cleaning.

Moreover, under an acidic polishing condition having a pH of 0.5 to 4, an absolute value of a zeta potential on the surface of the glass substrate becomes small, and the colloidal silica particles and minute foreign substances existing in the slurry is easy to bond solidly on the surface of the glass substrate containing $SiO_2$ as a main component during polishing. Thus, it is more difficult to remove them in the cleaning step. Therefore, in this case, cleaning having high etching property that deteriorates the surface roughness is necessary to remove the colloidal silica particles and minute foreign substances. As a result, it is very difficult to achieve both of reduction of surface roughness and reduction of minute defects that are required for a surface of a substrate for mask blanks used in EUV. In fact, the surface roughness of the glass substrate described in JP-A 2006-35413 is not sufficiently reduced, and the surface roughness RMS is at least about 0.09 nm. It cannot be said that the surface quality is sufficient as a substrate for mask blanks used in EUVL.

On the other hand, CARE described in WO 2013/146990 A1 is chemical polishing, and this method has lower processing efficiency than polishing using abrasive grains and requires a long time for processing. In fact, a processing time of CARE requires 50 minutes in Example 5 of WO 2013/146990 A1. Further, CARE needs an apparatus to which a polishing mechanism completely different from an apparatus for a generally-used polishing method using abrasive grains is applied. Furthermore, CARE is used a very expensive Pt as the catalyst. Therefore, CARE has low productivity and has economic disadvantage.

The present invention has been made to solve the above problems, and an object of the present invention is to provide a polishing composition that is suitable for polishing a surface of a substrate such as a glass substrate containing $SiO_2$ as a main component, particularly, for polishing a surface of a substrate for mask blanks used in EUVL, and a polishing composition that can prepare, with high productivity, a substrate that has a surface having a high flatness, low defects and a low surface roughness.

The inventors have been found a polishing composition that includes a colloidal silica containing colloidal silica particles, particularly, colloidal silica particles existing in the polishing composition having a maximum of an auto-correlation function G2(f), which is calculated from the predetermined expression, of not less than 1.40 in a region of frequency f of not less than 0.001 MHz and not more than 1 MHz, and a pH adjusting agent, and a chelating agent. Further, the inventors have been found that a substrate that has a surface having a high flatness, low defects and a low surface roughness can be prepared with low cost and high productivity by using the polishing composition, and in particular, this polishing composition is further effective for use in the final polishing of to the surface of the substrate.

In one aspect, the invention provides a polishing composition including a colloidal silica containing colloidal silica particles, a pH adjusting agent, and a chelating agent.

Preferably, in the polishing composition, a maximum of an auto-correlation function G2(f) is not less than 1.40 in a region of frequency f of not less than 0.001 MHz and not more than 1 MHz, G2(f) being obtained by variable transformation of $G_2$ (τ) with "frequency f=1/τ", wherein $G_2$ (τ) is calculated, from I(t) representing time dependency of intensity of scattered light that is obtained by measuring translational motion of the colloidal silica particles existing in the polishing composition measured by a dynamic light scattering method using laser, by the following expression (1):

$$G_2(\tau) = \frac{\langle I(t)\cdot I(t+\tau)\rangle}{\langle I(t)\rangle^2} = \frac{\left(\frac{\int_0^T I(t)\cdot I(t+\tau)dt}{T}\right)}{\left(\frac{\int_0^T I(t)dt}{T}\right)^2} = \frac{T\int_0^T I(t)\cdot I(t+\tau)dt}{\left(\int_0^T I(t)dt\right)^2} \quad (1)$$

wherein T is a measuring time of an intensity of scattered light, I(t) is an intensity of scattered light at an arbitrary time t, and I(t+τ) is an intensity of scattered light after a predetermined time τ has elapsed from the arbitrary time t.

Preferably, the colloidal silica particles have an average primary particle size DA1 of not less than 5 nm and not more than 50 nm that is calculated from a specific surface area measured by a gas absorption method.

Preferably, the colloidal silica particles contained in the colloidal silica have a degree of association P=DA2/DA1 of not more than 1.8 calculated by dividing a secondary particle size of the colloidal silica particles DA2 by the average primary particle size DA1, DA2 being measured by a dynamic light scattering method.

Preferably, the colloidal silica particles existing in the polishing composition have a zeta potential of not less than −40 mV and not more than −5 mV.

Preferably, the colloidal silica particles existing in the polishing composition have a polydispersity index of not more than 0.3.

Preferably, the polishing composition includes the colloidal silica particles of not less than 10 wt % and not more than 40 wt %.

Preferably, the polishing composition includes the pH adjusting agent of not less than 0.1 wt % and not more than 10 wt %.

Preferably, the polishing composition has a pH of not less than 8 and not more than 10.5.

Preferably, the polishing composition includes the chelating agent of not less than 0.1 wt % and not more than 10 wt %.

Preferably, the polishing composition is for polishing a glass substrate containing $SiO_2$ as a main component.

Advantageous Effects of the Invention

The polishing composition of the invention is easy to be removed in cleaning after polishing. Further, by using the polishing composition of the invention, a substrate that has a surface having a high flatness, low defects and a low surface roughness can be prepared with low cost and high productivity, and a substrate having high surface quality suitable as a substrate for mask blanks such as a glass substrate containing $SiO_2$ as a main component, particularly, as a substrate for mask blanks used in EUVL can be provided.

BRIEF DESCRIPTION OF THE DRAWINGS

FIG. 1 is a graph showing the values of auto-correlation function G2(f) of colloidal silica particles in the polishing compositions of Examples 1 to 4 and Comparative Example 1.

DESCRIPTION OF THE PREFERRED EMBODIMENT

A polishing composition of the invention includes a colloidal silica (a colloidal silica dispersion) containing colloidal silica particles, a pH adjusting agent, and a chelating agent. The colloidal silica is a water dispersion containing colloidal silica particles (silica particles in colloidal state). A method for synthesizing colloidal silica particles is not particularly limited. However, from the viewpoint of reducing metal contamination, high-purity colloidal silica particles prepared by hydrolyzing an organic silicate compound such as an alkoxysilane are preferable. As the colloidal silica, a commercial product may be used. Examples of the commercial products include GP series, PL series, BS series manufactured by Fuso Chemical Co., Ltd.

From the viewpoint of removing easily colloidal silica particles contained in the polishing composition that remains on the surface of the substrate after polishing, and achieving both reductions of surface roughness and concave defects, and polishing efficiency, an average primary particle size DA1 of the colloidal silica particles is preferably not less than 5 nm, and not more than 50 nm, more preferably not more than 30 nm. The average primary particle size DA1 of the colloidal silica particles may be calculated from a specific surface area (for example, BET specific surface area) measured by a gas adsorption method. In this case, the specific surface area may be measured with using a colloidal silica in the state before mixed in the polishing composition, and a specific surface area of the colloidal silica particles in dried state may be measured.

A degree of association P=DA2/DA1 calculated by dividing an average secondary particle size DA2 of colloidal silica particles contained in colloidal silica by the average primary particle size DA1 is preferably not more than 1.8, more preferably not more than 1.3. This average secondary particle size is an average secondary particle size of colloidal silica particles measured in the state of a water dispersion containing colloidal silica particles in the state before making the polishing composition. In addition, the average secondary particle size DA2 of the colloidal silica particles means an average particles size of secondary particles formed by association of the primary particles of the colloidal silica particles. For example, during synthesis of the primary particles of the colloidal silica particles, the primary particles are associated with each other to form the secondary particles. Thus, the degree of association P of less than 1 is not possible. The degree of association is theoretically not less than 1, however, a practical lower limit is generally not less than 1.1.

The shape of the colloidal silica particles is reflected in the degree of association P, and the level of the degree of association P usually depends on synthesis conditions of the colloidal silica particles. Generally, the colloidal silica particles having a degree of association P of closer to 1 have a particle shape closer to precise spherical shape that is advantageous in realizing the reduced surface roughness and the reduced concave defects required for the substrate surface. On the other hand, non-uniformity of the surface shape of the substrate after polishing increases when proportion of particles having anisotropy in shape increases. Thus, to suppress causes of deterioration of surface roughness and generation of concave defects, the degree of association is preferably not more than 1.8. In addition, the average secondary particle size DA2 of colloidal silica particles may be measured by a dynamic light scattering method. In this case, the measurement by the dynamic light scattering method may be conducted with using a water dispersion containing colloidal silica particles in the state before mixed in the polishing composition (in the state in which colloidal silica particles are dispersed in water).

To suppress deterioration of productivity due to decrease of polishing efficiency and increase of load in cleaning process due to increase of colloidal silica particles adhering to the surface of the substrate after polishing, the polishing composition includes the colloidal silica particles of preferably not less than 10 wt %, and preferably not more than 40 wt %, more preferably not more than 30 wt %.

An alkali metal hydroxide, an alkaline earth metal hydroxide, a basic salt, an amine, ammonia and the like may be used as the pH adjusting agent, however, not particularly limited thereto. Examples of the pH adjusting agents include potassium hydroxide, sodium hydroxide, calcium hydroxide, sodium borate, monoethanolamine, diethanolamine, triethanolamine and ethylenediamine. Among them, diethanolamine and triethanolamine, which can be uniformly miscible with water at an arbitrary ratio to form a chelate complex with metal ions, are preferable. The pH adjusting agent may be used by one kind alone or a combination of two or more kinds. Further, from the viewpoint of adjusting the pH of the polishing composition within a desirable range with suppressing increment of viscosity of the polishing composition, the polishing composition includes the pH adjusting agent of preferably not less than 0.1 wt %, and preferably not more than 10 wt %, more preferably not more than 5 wt %.

A pH of the polishing composition of the invention is preferably not less than 8, more preferably not less than 8.5 to obtain good dispersion stability of colloidal silica particles in the polishing composition, further from the viewpoint of suppressing deterioration of cleanability since the colloidal silica particles and minute foreign substances existing in the polishing composition are easy to adhere strongly to the substrate surface while polishing when the absolute value of zeta potential on the surface of the substrate is reduced. On the other hand, since a surface roughness required for the surface of the substrate for mask blanks used is EUVL cannot be attained when the surface roughness of the substrate deteriorates, from the viewpoint of avoiding the condition hard to obtain the required surface roughness, the pH of the polishing composition is preferably not more than 10.5, more preferably not more than 10.

Aldonic acids, aminocarboxylic acids, hydroxycarboxylic acids, phosphonic acids, and salts thereof can be used as the chelating agent, however, not particularly limited thereto. Examples of the chelating agents include gluconic acid, glucoheptonic acid, nitrilotriacetic acid, hydroxyethylethylenediamine triacetic acid, ethylenediamine tetraacetic acid, diethylenetriamine pentaacetic acid, triethylenetetramine hexacetic acid, citric acid, malic acid, 1-hydroxyethylidene-1,1-diphosphonic acid, nitrilotris(methylenephosphonic acid), 2-phosphonobutane-1,2,4-tricarboxylic acid, pyrophosphoric acid and salts thereof. Among them, hydroxycarboxylic acids such as citric acid and malic acid, and aminocarboxylic acids such as nitrilotriacetic acid, hydroxyethylethylenediamine triacetic acid, ethylenediamine tetraacetic acid, diethylenetriamine pentaacetic acid, and triethylenetetramine hexacetic acid are preferable. Further, citric acid, ethylenediamine tetraacetic acid, diethylenetriamine pentaacetic acid, and triethylenetetramine hexacetic acid, which form a stable chelate complex with metal ions difficult to completely remove from polishing environment, are more preferable. The chelating agent may be used by one kind alone or a combination of two or more kinds.

Metal ions existing in the polishing composition significantly inhibit dispersion of colloidal silica particles and accelerate adhesion of colloidal silica particles to the surface of the substrate and generation of coarse particles that cause polishing scratches. When the polishing composition contains a chelating agent, the influence of metal ions can be controlled. Further, from the viewpoint of ensuring dispersion stability of colloidal silica particles with sufficiently suppressing the influence of metal ions, the polishing composition contains the chelating agent of preferably not less than 0.1%, and preferably not more than 10 wt %, more preferably not more than 5 wt %, even more preferably not more than 1 wt %.

The electric double layer surrounded the surface of the colloidal silica particle in the colloidal silica is changed by adding the pH adjusting agent and the chelating agent to the colloidal silica. As a result, the surface of the colloidal silica particle in the colloidal silica has different surface properties compared with that in the colloidal silica not containing the pH adjusting agent and the chelating agent.

In the polishing composition of the invention, a maximum of an auto-correlation function G2(f) is preferably not less than 1.40, more preferably not less than 1.45 in a region of frequency f of not less than 0.001 MHz and not more than 1 MHz. G2(f) is obtained by variable transformation of $G_2(\tau)$ with "frequency f=1/τ", and $G_2(\tau)$ is calculated, from I(t) representing time dependency (temporal fluctuation) of intensity of scattered light that is obtained by measuring translational motion of the colloidal silica particles existing in the polishing composition measured by a dynamic light scattering method using laser, by the following expression (1):

$$G_2(\tau) = \frac{\langle I(t)\cdot I(t+\tau)\rangle}{\langle I(t)\rangle^2} = \frac{\left(\dfrac{\int_0^T I(t)\cdot I(t+\tau)dt}{T}\right)}{\left(\dfrac{\int_0^T I(t)dt}{T}\right)^2} = \frac{T\int_0^T I(t)\cdot I(t+\tau)dt}{\left(\int_0^T I(t)dt\right)^2} \tag{1}$$

wherein T is a measuring time of an intensity of scattered light, I(t) is an intensity of scattered light at an arbitrary time t, and $I(t+\tau)$ is an intensity of scattered light after a predetermined time $\tau$ has elapsed from the arbitrary time t.

If the maximum of the auto-correlation function G2(f) is less than 1.40 in the region of frequency f of not less than 0.001 MHz and not more than 1 MHz, it may be difficult to remove the colloidal silica particles left on the surface of the substrate by ultrasonic cleaning after polishing. G2(f) obtained by variable transformation of $G_2(\tau)$ with "frequency $f=1/\tau$" is useful for grasping the translational motion characteristics of colloidal silica particles in the polishing composition in viewpoint of frequency. It can be said that this is an index indicating how much colloidal silica particles existing in the polishing composition are aggregated each other. By adjusting each concentration of the components in the polishing composition so as to obtain the maximum of the auto-correlation function G2(f) of not less than 1.4 in the frequency range of 1 kHz (0.001 MHz) to 1 MHz that is utilized in ultrasonic cleaning for the substrate, the colloidal silica particles which have been adhered to the surface of the substrate after polishing can be removed easily, even when the polishing composition contains colloidal silica particles having a small average primary particle size.

From the viewpoint of preventing progress of aggregation and gelation during polishing caused by low dispersion stability of colloidal silica particles, the colloidal silica particles existing in the polishing composition have a zeta potential (a zeta potential in the state in which the colloidal silica particles present in the polishing composition) of preferably not more than −5 mV, more preferably not more than −10 mV. When the zeta potential exceeds 0 mV, in the case of a negatively charged substrate such as a glass substrate, colloidal silica particles in the polishing composition strongly adhere to the surface, and it tends to be difficult to remove by washing. The same tendency appears even when the zeta potential is in the range of more than −5 mV and not more than 0 mV. The lower the zeta potential, the higher the dispersion stability of the colloidal silica particles. However, when the dispersion stability is high, each of the colloidal silica particles in the polishing composition adheres to the surface of the substrate in form of a primary particle. As a result, the cleanability may deteriorate. From the viewpoint of suppressing this issue, the zeta potential of the colloidal silica particles existing in the polishing composition is preferably not less than −40 mV, more preferably not less than −35 mV.

From the viewpoint of suppressing deterioration of surface roughness and increase of concave defects caused by uneven shape of the surface of the substrate formed by polishing with the secondary particles having nonuniform particle size, the colloidal silica particles existing in the polishing composition have a polydispersity index (a polydispersity index in the state in which the colloidal silica particles present in the polishing composition) of preferably not more than 0.3, more preferably not more than 0.2. The polydispersity index is an index indicating uniformity of the particle size of the secondary particles, and can be measured by a dynamic light scattering method. The polydispersity index is theoretically not less than 0, however, a practical lower limit is generally not less than 0.01.

The polishing composition of the invention is preferably used for polishing a substrate such as a glass substrate containing $SiO_2$ as a main component, particularly used as an abrasive compound for final polishing (finishing polishing). The glass substrate containing $SiO_2$ as a main component is generally used for a substrate for mask blanks used in a lithography technique in which fine patterns are drawn with using EUV light. Particularly in surface polishing of a glass substrate containing $SiO_2$ as a main component, a surface having a high flatness, low defects and a low surface roughness can be formed by surface polishing using the polishing composition of the invention. Examples of the glass substrates containing $SiO_2$ as a main component include a synthetic quartz glass substrate composed of $SiO_2$, and a titania-doped synthetic quartz glass substrate (for example, a titania-doped synthetic quartz glass substrate in which titania is doped in a synthetic quartz glass at a concentration of 5 to 10 wt %), however, not particularly limited thereto. In particular, since it is necessary to use a substrate having a small coefficient of thermal expansion in exposure process by EUVL, the titania-doped synthetic quartz glass substrate is suitable as a substrate for mask blanks used in EUVL.

The substrate is prepared by cutting a material into a predetermined size, further processing if necessary, and surface-polishing, by means suitable for the material. For example, in the case of a glass substrate such as a glass substrate containing $SiO_2$ as a main component, for example, a glass ingot of the material is molded, annealed, sliced, chamfered, and lapped to obtain a raw material substrate. The substrate can be prepared by the polishing of the raw material substrate that includes the steps of, for example, a rough-polishing step, a flatness measuring step for measuring the flatness of the surface of the rough-polished substrate, a partial polishing step, and a final polishing step. It is particularly effective to use the polishing composition of the invention in the final polishing step that influences to surface quality. As polishing using an abrasive compound, a batch-type double-sided polishing is generally used. However, the polishing using the polishing composition of the invention may be used in either a batch polishing or a single piece polishing, further in either a double-sided polishing or a single-sided polishing.

The glass substrate containing $SiO_2$ as a main component polished with using the polishing composition of the invention can be preferably used for a semiconductor-related electronic material. Particularly, it is suitable for a low-defect substrate for mask blanks (for example, on a main surface of 132 mm×132 mm, a number of defects having a size of not less than 34 nm is not more than 5) required for a substrate for mask blanks used in EUVL which is recognized as the most advanced process in the field of lithography technique.

EXAMPLES

Examples of the invention are given below by way of illustration and not by way of limitation.

Example 1

A polishing composition was prepared by adding triethanolamine as a pH adjusting agent, and citric acid as a chelating agent into a colloidal silica containing colloidal silica particles having an average primary particle size DA1 of 14 nm, an average secondary particle size DA2 of 18 nm, and a degree of association P=DA2/DA1 of 1.3 to form the polishing composition having a content of the colloidal silica particles of 20 wt %, a content of the pH adjusting agent of 0.3 wt %, and a content of the chelating agent of 0.1 wt %.

An auto-correlation function G2(f) obtained by variable transformation of $G_2(\tau)$ with "frequency $f=1/\tau$" was calculated. $G_2(\tau)$ is calculated, from I(t) representing time dependency of intensity of scattered light that is obtained by measuring translational motion of the colloidal silica particles existing in the polishing composition measured by a dynamic light scattering method using laser, by the following expression (1):

$$G_2(\tau) = \frac{\langle I(t) \cdot I(t+\tau) \rangle}{\langle I(t) \rangle^2} = \frac{\left( \frac{\int_0^T I(t) \cdot I(t+\tau) dt}{T} \right)}{\left( \frac{\int_0^T I(t) dt}{T} \right)^2} = \frac{T \int_0^T I(t) \cdot I(t+\tau) dt}{\left( \int_0^T I(t) dt \right)^2} \tag{1}$$

wherein T is a measuring time of an intensity of scattered light, I(t) is an intensity of scattered light at an arbitrary time t, and I(t+τ) is an intensity of scattered light after a predetermined time τ has elapsed from the arbitrary time t. The results are shown in FIG. 1. A maximum of the auto-correlation function G2(f) was 1.46 in a region of frequency f of not less than 0.001 MHz and not more than 1 MHz. Further, the colloidal silica particles existing in the polishing composition had a zeta potential of −35 mV, and a polydispersity index of 0.04, and the polishing composition had a pH of 8.2.

A final polishing (finishing polishing) of the main surfaces (both surfaces) of four titania-doped glass substrates that have dimensions of 152 mm×152 mm and 6.35 mm-thick was performed with using the obtained polishing composition. The polishing was performed with using a soft suede polishing cloth, and under the conditions of a polishing pressure of 100 gf/cm$^2$ (about 9.81 kPa), a polishing time of 30 minutes, and a polishing allowance which is an amount (at least 0.1 μm) enough to remove scratches formed in a rough-polishing step.

After polishing, the substrate was washed and dried, and a surface roughness (RMS) of the polished surface was measured by an atomic force microscope (manufactured by Oxford Instruments). The surface roughness was 56 pm on average. A flatness (TIR) of the polished surface was measured by a flatness measuring system for a photomask (manufactured by TROPEL). The flatness was 19 nm on average. Further, defect inspection of the polished surface was performed by a laser confocal optical system high-sensitivity defect inspection device (manufactured by Lasertec Corporation). The detected numbers of defects of not less than 34 nm-size were 1.5 on average. The shape of the defects was observed by the atomic force microscope. The numbers of concave defects and convex defects were 0.75 and 0.75, respectively, on average.

Example 2

A polishing composition was prepared by the same manner as in Example 1 except that the content of the pH adjusting agent was 3.0 wt %, and the content of the chelating agent was 1.0 wt %. The auto-correlation function G2(f) was calculated by the same manner as in Example 1. The results are shown in FIG. 1. The maximum of an auto-correlation function G2(f) was 1.50 in a region of frequency f of not less than 0.001 MHz and not more than 1 MHz. Further, the colloidal silica particles existing in the polishing composition had a zeta potential of −30 mV, and a polydispersity index of 0.04, and the polishing composition had a pH of 8.5.

A final polishing (finishing polishing) of the titania-doped glass substrates was performed by the same manner as in Example 1 with using the obtained polishing composition. After polishing, a surface roughness (RMS) and a flatness (TIR) of the polished surface was measured by the same manner as in Example 1. The surface roughness was 55 pm on average, and the flatness was 20 nm on average. Further, defect inspection of the polished surface was performed by the same manner as in Example 1. The detected numbers of defects of not less than 34 nm-size were 3.50 on average. The shape of the defects was observed by the atomic force microscope. The numbers of concave defects and convex defects were 0.50 and 3.0, respectively, on average.

Example 3

A polishing composition was prepared by the same manner as in Example 2 except that the pH adjusting agent was diethanolamine. The auto-correlation function G2(f) was calculated by the same manner as in Example 1. The results are shown in FIG. 1. The maximum of an auto-correlation function G2(f) was 1.46 in a region of frequency f of not less than 0.001 MHz and not more than 1 MHz. Further, the colloidal silica particles existing in the polishing composition had a zeta potential of −29 mV, and a polydispersity index of 0.03, and the polishing composition had a pH of 9.4.

A final polishing (finishing polishing) of the titania-doped glass substrates was performed by the same manner as in Example 1 with using the obtained polishing composition. After polishing, a surface roughness (RMS) and a flatness (TIR) of the polished surface was measured by the same manner as in Example 1. The surface roughness was 58 pm on average, and the flatness was 22 nm on average. Further, defect inspection of the polished surface was performed by the same manner as in Example 1. The detected numbers of defects of not less than 34 nm-size were 3.00 on average. The shape of the defects was observed by the atomic force microscope. The numbers of concave defects and convex defects were 0.75 and 2.25, respectively, on average.

Example 4

A polishing composition was prepared by the same manner as in Example 2 except that the chelating agent was diethylenetriamine pentaacetic acid. The auto-correlation function G2(f) was calculated by the same manner as in Example 1. The results are shown in FIG. 1. The maximum of an auto-correlation function G2(f) was 1.46 in a region of frequency f of not less than 0.001 MHz and not more than 1 MHz. Further, the colloidal silica particles existing in the polishing composition had a zeta potential of −19 mV, and a polydispersity index of 0.03, and the polishing composition had a pH of 8.4.

A final polishing (finishing polishing) of the titania-doped glass substrates was performed by the same manner as in Example 1 with using the obtained polishing composition. After polishing, a surface roughness (RMS) and a flatness (TIR) of the polished surface was measured by the same manner as in Example 1. The surface roughness was 55 pm on average, and the flatness was 21 nm on average. Further, defect inspection of the polished surface was performed by the same manner as in Example 1. The detected numbers of defects of not less than 34 nm-size were 4.0 on average. The shape of the defects was observed by the atomic force microscope. The numbers of concave defects and convex defects were 0.50 and 3.50, respectively, on average.

Comparative Example 1

A polishing composition of only a colloidal silica containing colloidal silica particles having an average primary particle size DA1 of 14 nm, an average secondary particle size DA2 of 18 nm, and a degree of association P=DA2/DA1 of 1.3 was prepared to form the polishing composition having a content of the colloidal silica particles of 20 wt % with adding neither the pH adjusting agent nor the chelating agent. The auto-correlation function G2(f) was calculated by the same manner as in Example 1. The results are shown in FIG. 1. The maximum of an auto-correlation function G2(f) was 1.35 in a region of frequency f of not less than 0.001 MHz and not more than 1 MHz. Further, the colloidal silica particles existing in the polishing composition had a zeta potential of −44 mV, and a polydispersity index of 0.32, and the polishing composition had a pH of 7.7.

A final polishing (finishing polishing) of the titania-doped glass substrates was performed by the same manner as in Example 1 with using the obtained polishing composition. After polishing, a surface roughness (RMS) and a flatness (TIR) of the polished surface was measured by the same manner as in Example 1. The surface roughness was 65 pm on average, and the flatness was 25 nm on average. Further, defect inspection of the polished surface was performed by the same manner as in Example 1. The detected numbers of defects of not less than 34 nm-size were 299.00 on average. The shape of the defects was observed by the atomic force microscope. The numbers of concave defects and convex defects were 1.25 and 297.75, respectively, on average.

Japanese Patent Application No. 2021-086958 is incorporated herein by reference.

Although some preferred embodiments have been described, many modifications and variations may be made thereto in light of the above teachings. It is therefore to be understood that the invention may be practiced otherwise than as specifically described without departing from the scope of the appended claims.

The invention claimed is:

1. A polishing composition comprising a colloidal silica comprising colloidal silica particles, a pH adjusting agent, and a chelating agent, wherein the colloidal silica particles contain secondary particles formed by association of primary particles, the primary particles have an average primary particle size DA1 of not less than 5 nm and not more than 50 nm that is calculated from a specific surface area measured by a gas absorption method, the colloidal silica particles have a degree of association P32 DA2/DA1 of not more than 1.8 calculated by dividing a secondary particle size DA2 by the average primary particle size DA1, DA2 being measured by a dynamic light scattering method, and a maximum of an auto-correlation function G2(f) is not less than 1.40 in a region of frequency f of not less than 0.001 MHz and not more than 1 MHz, G2(f) being obtained by variable transformation of G2 (t) with "frequency f=1/τ", wherein $G_2(\tau)$ is calculated, from I(t) representing time dependency of intensity of scattered light that is obtained by measuring translational motion of the colloidal silica particles existing in the polishing composition measured by a dynamic light scattering method using laser, by the following expression (1):

$$G_2(\tau) = \frac{\langle I(t)\cdot I(t+\tau)\rangle}{\langle I(t)\rangle^2} = \frac{\left(\frac{\int_0^T I(t)\cdot I(t+\tau)dt}{T}\right)}{\left(\frac{\int_0^T I(t)dt}{T}\right)^2} = \frac{T\int_0^T I(t)\cdot I(t+\tau)dt}{\left(\int_0^T I(t)dt\right)^2} \tag{1}$$

wherein T is a measuring time of an intensity of scattered light, I(t) is an intensity of scattered light at an arbitrary time t, and I(t+τ) is an intensity of scattered light after a predetermined time τ has elapsed from the arbitrary time t.

2. The polishing composition of claim 1 wherein the colloidal silica particles contained in the colloidal silica have the degree of association P=DA2/DA1 of not more than 1.3.

3. The polishing composition of claim 1 wherein the colloidal silica particles existing in the polishing composition have a zeta potential of not less than −40 mV and not more than −5 mV.

4. The polishing composition of claim 1 wherein the colloidal silica particles existing in the polishing composition have a polydispersity index of not more than 0.3.

5. The polishing composition of claim 1 wherein the polishing composition comprises the colloidal silica particles of not less than 10 wt % and not more than 40 wt %.

6. The polishing composition of claim 1 wherein the polishing composition comprises the pH adjusting agent of not less than 0.1 wt % and not more than 10 wt %.

7. The polishing composition of claim 1 having a pH of not less than 8 and not more than 10.5.

8. The polishing composition of claim 1 wherein the polishing composition comprises the chelating agent of not less than 0.1 wt % and not more than 10 wt %.

9. The polishing composition of claim 1 for polishing a glass substrate containing $SiO_2$ as a main component.

10. The polishing composition of claim 1 wherein the chelating agent comprises citric acid.

* * * * *